United States Patent [19]

Vogel Viola et al.

[11] Patent Number: 5,006,410

[45] Date of Patent: Apr. 9, 1991

[54] FILM COMPRISING AT LEAST ONE UNIMOLECULAR LAYER

[75] Inventors: Vogel Viola, Göttingen; Dietmar Möbius, Waake, both of Fed. Rep. of Germany

[73] Assignee: Hoechst Aktiengesellschaft, Frankfurt am Main, Fed. Rep. of Germany

[21] Appl. No.: 221,898

[22] Filed: Jul. 20, 1988

[30] Foreign Application Priority Data

Jul. 23, 1987 [DE] Fed. Rep. of Germany ....... 3724364

[51] Int. Cl.$^5$ .................. B32B 9/04; B32B 27/00
[52] U.S. Cl. .................. 428/411.1; 428/421; 428/516; 428/441; 428/442; 428/378; 428/461; 428/463; 427/164; 427/402; 210/639
[58] Field of Search .................. 428/411.1, 421; 427/164, 402

[56] References Cited

U.S. PATENT DOCUMENTS 4,536,450 8/1985 Garito .................. 428/441.1
4,598,056 7/1986 Barraud et al. .................. 502/4

Primary Examiner—P. C. Sluby

[57] ABSTRACT

A closely packed film comprising at least one unimolecular layer which contains at least one amphiphilic compound whose hydrophobic molecular region comprises at least one hydrocarbon chain which has been chemically modified, at least terminally, is distinguished by very good adhesion between the film and the adjacent layer (monolayer or substrate) on contact between the hydrophobic region of the film with the hydrophobic surface of the adjacent layer, and on contact between the hydrophilic region of the film and the hydrophobic region of the adjacent layer, and vice versa.

Films of this type can be used with advantage, for example, for improving the surface-slip characteristics of the substrate, in the production of sensors or in semiconductor technology.

7 Claims, No Drawings

FILM COMPRISING AT LEAST ONE UNIMOLECULAR LAYER

DESCRIPTION

The invention relates to a film comprising at least one unimolecular layer.

Densely packed unimolecular lipid films having a layer thickness from 2-3 nm can be produced at the boundary layer of liquids by pushing the molecules together. Surface-active molecules comprise at least two molecular sub-units which differ greatly in their water solubility. The one sub-unit is hydrophilic (readily water soluble), the other is hydrophobic (virtually water insoluble). Typical hydrophilic groups (head groups) are the hydroxyl (—OH), carboxyl (—COOH) and phosphatidyl groups of phospholipids. The hydrophobic components of the molecules are mostly hydrocarbon chains of empirical formulae —$(CH_2)_n$—$CH_3$. The polar head group anchors the molecule in the boundary layer and prevents unordered movement of the molecules over one another. The hydrophobic radical prevents the molecule submerging in the aqueous sub-phase. The surface activity of the amphiphile depends on the ratio between the polar and nonpolar groups and the solubility thereof.

Due to the strong surface anchoring, the chain-form molecules, which are asymmmetric with respect to the polarity, can be pushed together using a barrier, and the chains are oriented perpendicular to the boundary layer as the density increases. During compression, self-organization of the molecules causes formation in the boundary layer of a highly ordered, unimolecular film.

In order to use these highly ordered films, it is essential that they be transferable onto solid base materials. This takes place by vertical lowering and removing the base material through the monofilm-covered water surface.

Using the method named after Langmuir and Blodgett (LANGMUIR 1920, BLODGETT 1936) (LB technique), layered systems of unimolecular films can be built up. The transfer of a film from the liquid phase onto a solid base material while keeping the shear constant is apparent as a decrease in the film-covered water surface during the dipping operation. In addition, lowering of the base material virtually parallel to the monofilm-covered water surface ("flat dipping") is also possible.

A hyperfiltration membrane which contains a support layer and a separating layer is known (cf. EP-A 59,393). In the membrane, the separating layer comprises a transversely crosslinked, unimolecular film of molecules, the molecules of the separating layer being, in the uncrosslinked state, surfactants or surfactant-like lipids having at least one hydrophobic chain and at least one hydrophilic group, the hydrophobic chains of these molecules being oriented, after transverse crosslinking, primarily perpendicular to the membrane plane and parallel to the diffusion direction, and the molecules of the separating layer being transversely crosslinked with one another via functional groups in at least one of their hydrophobic chains and/or via functional groups in at least one of their hydrophilic groups. The lateral tear strength within a monofilm is increased through the production process.

The construction and use of the systems comprising unimolecular layers requires reliable transfer of the films from the water surface onto solid base materials. The systems should be stable in air, in vacuo and in contact with solutions. A basic requirement is therefore controlled adhesion of the films to the substrate. In the method of layer construction which is customary today, a boundary layer containing hydrophilic groups, for example carboxyl groups, is followed by a boundary layer of hydrophobic groups, for example methyl groups. The adhesion between charged hydrophilic groups is achieved, inter alia, by incorporating divalent ions. The hydrophobic terminal groups of the layers in contact adhere to one another due to the van der Waals interactions.

The object of the invention was therefore to find films which, at low cost, have reliable adhesion to the substrate.

It has been found that the object can be achieved by means of a film which comprises at least one unimolecular layer containing at least one specific amphiphilic compound.

The invention thus relates to the film described in the claims and to the process for its production.

The film according to the invention comprises at least one unimolecular layer which has been transferred onto a base material and contains a particular amphiphilic compound or comprises this amphiphilic compound. The hydrophobic molecular region of this compound comprises at least one hydrocarbon chain which has been chemically modified, at least terminally. The particular amphiphilic compound preferably has the general formula

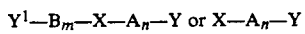

where

X denotes a polar group,

A and B denote methene or halogenated methene groups and $Y^1$ denotes a methyl or halogenated methyl group, Y denotes a substituent whose polarity differs from the hydrophobic chain and is less than or equal to X, n is greater than or equal to m and m denotes an integer from 4 to 25.

A preferably represents the $CH_2$ group. This then gives a compound of the formula (I)

$$X—(CH_2)_n—Y \qquad (1)$$

in which X is a hydrophilic group, preferably a hydroxyl, carboxyl or amino group, and Y is a chemically modified substituent whose dipole moment is less than or equal to that of X. Further possibilities for X are the radicals $NR^1R^2$, where $R^1$ represents H or $C_1$-$C_4$-alkyl and $R^2$ represents $C_1$-$C_4$-alkyl or represents $CH_2CH_2OH$, $N^+R^1R^2R^3$, where $R^1$, $R^2$ and $R^3$ represent methyl or ethyl, or $NH_3^+$.

In particular, Y denotes a phenyl radical, an at least partially halogenated group, for example the $(CA_2)_mCB_3$ radical where A and B, independently of one another, represent halogen, in particular Cl or F, and m denotes a number from 0 to 18, an ester group —$CO_2R$, preferably a methyl or ethyl ester group, the acid ester groups —$OCO(CH_2)_pCH_3$ where p denotes a number from 0 to 4, or a mercapto group.

Examples of compounds of the formula I are listed in the Table below.

| X—$(CH_2)_n$ | Y |
|---|---|
| $CH_3(CH_2)_4$—O—CO $(CH_2)_{20}$ | Phenyl |
| $COOH(CH_2)_{14}$ | CO-p-tolyl |

| X—(CH$_2$)$_n$ | Y |
|---|---|
| HO—(CH$_2$)$_{16}$ | Pyrenyl (C$_{16}$H$_{19}$) |
| CH$_3$(CH$_2$)$_6$—NH—(CH$_2$)$_{10}$ | CF$_3$ |

The dipole moments of some groups are shown below:

CH$_3$—: +0,35 D; —COOH: −0.2 D; CF$_3$: —0.41 D; N$^+$H(CH$_3$)$_2$: +0.78 D; N$^+$H$_3$: 0.14 D; CO$_2$CH$_3$: −0.05 D; CH$_2$OH: −0.12 D phosphatidylcholine: +0.12 D; phosphatidylethanolamine: −0.09 D A negative sign indicates that the dipole moment of the monofilm points towards the water. Dipole moments of further groups can be calculated via the dipole moments of known compounds. For example, if the compound XY has the dipole moment U and the group X has the known dipole moment Z, the dipole moment of the group Y is calculated from $\mu_\mu = U - Z$.

An amphiphilic compound of the formula (II)

$$X-(CH_2)_n-(CF_2)_m-CF_3 \quad (II)$$

in which X has the abovementioned meaning, n is an integer from 6–24, m is a number from 0–18 and the sum of n+m is an integer from 6 to 24, is particularly preferred.

It is also possible to use compounds of the formula (I) or (II) together with a compound of the formula (III)

$$X^1-(CH_2)_p-CH_3 \quad (III)$$

Molar mixing ratios I:III or II:III from 1:1 to 1:10, in particular 1:1 to 1:4, are preferred. n is preferably 6–24, in particular 8–24. In the formula (III), X$^1$ denotes a hydrophilic group and p is a number from 12 to 24.

In the film, the molecules of the layer-forming amphiphilic compound are oriented in the same direction and parallel to one another. An orientation essentially perpendicular to the layer plane is preferred since the films then obtained are mechanically particularly stable.

In addition, the film according to the invention preferably comprises at least two unimolecular layers. In this case, two types of contact between adjacent layers are possible:

(1) The molecules of adjacent layers all preferably face the hydrophilic/hydrophobic surface of the adjacent layer with their hydrophilic/hydrophobic region. The adjacent layers differ in their chemical composition.

(2) The molecules of adjacent layers all preferably face the hydrophobic/hydrophilic surface of the adjacent layer with their hydrophilic/hydrophobic region. The adjacent layers may differ in their chemical composition.

In a preferred embodiment of the film according to the invention, the film comprises a unimolecular layer comprising at least one particular amphiphilic compound with the hydrophobic region of its molecules in contact with the hydrophobic surface of a base material.

In particular, the particular amphiphilic compound has a hydrophobic molecular region having a dipole moment which, at the contact face, points in the same direction as the dipole moment of the hydrophobic molecular region of the amphiphilic compound which essentially forms the adjacent layer. For the purposes of this application, the dipole moment Y is less than or equal to that of X if the dipole moment of CH$_3$Y is less than or equal to that of CH$_3$X.

In order to produce the films according to the invention, the amphiphilic compounds are applied (spread), in a highly volatile solvent, onto the surface of a polar sub-phase, usually water. Compounds of low water solubility (a maximum of 10 g/l) are preferred since otherwise films on water are difficult to produce using the LB technique. However, the water solubility is unimportant for the nonlinear optical properties of the film. After evaporation, the film formed is pushed together by a movable barrier. The mean area per molecule is calculated from the dimensions of the surface, the spread volume and the concentration of the solution. Phase transitions during compression of the molecules can be followed from the shear/area isotherms.

The change in surface tension $\pi$ on compression of surface-active molecules, also known as shear, is defined as $$\pi = \sigma_{H2O} - \sigma_M$$

$\sigma$H$_2$O is the surface tension of the free water surface, $\sigma$M is that of the monofilm-covered water surface. The The closest possible packing of the molecules in a unimolecular film is indicated by the steep increase in the isotherms. The area of about 20 Å$^2$ corresponds to the area requirement of a vertical hydrocarbon chain.

The molecules are pushed together using a barrier, the chains being oriented perpendicular to the boundary layer as the density increases. During compression, self-organization of the molecules in the boundary layer causes the production of a highly ordered, unimolecular film whose constant layer thickness is determined only by the chain length of the molecules. The typical thickness of a film of this type is between 2 and 3 nm.

The film is transferred onto the base material by flat or vertical dipping and vertical removal of a suitable base material from the aqueous sub-phase.

Suitable base materials are solids having clean surfaces, such as, for example, glass, ceramic or metal plates and fibers, metal and semiconductor surfaces, or files and fibers made of polystyrene, polypropylene, polyethylene and other plastics.

The films according to the invention are distinguished by great evenness and very good adhesion to the base material. They can be used, for example, to improve the surface-slip characteristics of the base material, for example of read/write heads of magnetic recording instruments, in the production of sensors in semiconductor technology, in nonlinear optics and in pyroelectric materials. The invention is described in greater detail by means of the Examples.

STARTING MATERIALS

The compounds used in the Examples and their structural formulae are given below:

| Compound | Symbol | Structural formula |
|---|---|---|
| Hexadecane | HD | H$_3$C—(CH$_2$)$_{14}$—CH$_3$ |
| Fatty acids | C$_n$ | H$_3$C—(CH$_2$)$_{n-2}$—COOH |
| Trifluorooctadecanoic acid | F$_3$C$_{18}$ | F$_3$C—(CH$_2$)$_{16}$—COOH |
| octadecandioicacid monomethylester | ME-C$_{18}$ | H$_3$COOC—(CH$_2$)$_{16}$—COOH |
| Methyl stearate | C18-ME | H$_3$C—(CH$_2$)$_{16}$—COOCH$_3$ |
| Eicosylamine | C20-NH$_2$ | H$_3$C—(CH$_2$)$_{19}$—NH$_2$ |
| Di-octadecyldimethylammonium bromide | DOMA | H$_3$C—(CH$_2$)$_{17}$ \\ \ \ \ \ \ \ \ \ \ \ \ \ \ \ \ \ \ N$^+$(CH$_3$)$_2$ Br$^-$ / H$_3$C—(CH$_2$)$_{17}$ |

-continued

| Compound | Symbol | Structural formula |
|---|---|---|
| Cyanine dye | S9 | (benzoxazole cyanine with $C_{18}H_{37}$ groups, $ClO_4^-$ counterion) |

The purity of the compounds used for the production of the unimolecular films is greater than 99%. The compounds were spread in $(1-5) \times 10^{-3}$ molar $CHCL_3$ solutions. The solvent used was chloroform, $CHCl_3$, re-purified by column chromatography and with an added 1% by volume of ethanol. Equimolar mixtures of $F_3C_{18}$ and $C_{16}$ were used.

The sub-phase used was exclusively bidistilled water.

The glass slides were cleaned in chromosulfuric acid and rinsed several times with water. In Comparison Example C and Example 3), they were subsequently silylated in the gas phase for hydrophobization.

COMPARISON EXAMPLES A AND B AND EXAMPLES 1 AND 2

In each case, a layered system comprising four monolayers was applied using the LB technique to the hydrophilic surface of a rectangular glass slide having a total surface area of 8 cm². The dipping direction through the monofilm-covered water surface was upwards-downwards-upwards-downwards through the uncovered water surface-upwards. The structure of the first and second monolayers was identical in all the layered systems. They differed in the chemical composition of the third and fourth (last-applied) monolayers. Whereas the third monolayer in Comparison Examples A and B comprised compounds containing unfluorinated hydrocarbon chains, it contained terminally fluorinated compounds in Examples 1 and 2. In each case, a long-chain substituted fluorescence dye (S9) was added in small concentrations (matrix:dye molar ratio = 100:1) to the coating product for the third monolayer. By means of fluorescent excitation of this third monolayer, it was possible to test at any time whether this monolayer had detached from the base material or not during subsequent manipulations. In this respect, the dipping of the sample through the uncovered water surface was particularly crucial. This step is necessary in order to bring the nonpolar chain ends of the third layer into contact with the polar head groups of the fourth monolayer during absorption.

The decrease with time in the film-covered water surface area during transfer of each of the second, third and fourth monolayers was monitored (constant dipping speed). As a consequence of the rectangular geometry of the glass slide having a surface area of 8 cm², ideal transfer of a closely packed film took place when the surface area decreased in linear fashion with time by a maximum of 8 cm² at a constant dipping speed.

A total of four layered systems were produced. The procedure can be seen from the Table below.

| | Monofilm | | | |
|---|---|---|---|---|
| | 1 | 2 | 3 | 4 |
| Sub-phase (20° C.) | water + $CdCl_2$ ($3 \times 10^{-4}$ mol) | water without ionic additives | | |
| Dipping direction | upwards | downwards | upwards | upwards |
| Shear | 30 mN/m | 40 mN/m | 15 mN/m | 30 mN/m (A,1) 40 mN/m (B,2) |
| Comparison Example A | $C_{20}$ | $C_{20}$—$NH_2$ | $C_{18}$:$S_9$ | DOMA |
| Example 1 | $C_{20}$ | $C_{20}$—$NH_2$ | $F_3C_{18}$:$C_{16}$:$S_9$ | DOMA |
| Comparison Example B | $C_{20}$ | $C_{20}$—$NH_2$ | $C_{18}$:$S_9$ | $C_{20}$—$NH_2$ |
| Example 2 | $C_{20}$ | $C_{20}$—$NH_2$ | $F_3C_{18}$:$C_{16}$:$S_9$ | $C_{20}$—$NH_2$ |

The samples were dipped vertically to the water surface.

The transferred area was about 1 cm² or 4 cm² for the DOMA or $C_{20}$—$NH_2$ monofilms respectively (4th monolayer) if the underlying 3rd monolayer contained only compounds having unfluorinated hydrocarbon chains. The maximum film transfer for the 4th monolayer of 8 cm² was only achieved if the 3rd monolayer contained compounds having terminally fluorinated hydrocarbon chains.

Examples 1 and 2 show that maximum film transfer can be achieved when the dipole moments at the contact surface are pointed in the same direction. Complete film transfer is the prerequisite for good adhesion.

COMPARISON EXAMPLE C AND EXAMPLE 3

A multilayered system comprising unimolecular layers was again applied to a glass slide. The adhesion between the glass slide and the layered system was determined by bringing the layered system into contact with a second layered system (2 unimolecular layers of Cd arachidate) applied to polystyrene film and subsequently separating the film mechanically. The polystyrene film was in each case separated from the glass slide during the removal operation. On separation, sub-units of the layered system remained adhering to the polystyrene film or to the glass slide, depending on the degree of mechanical adhesion between the layered system and the base material.

Differences in the adhesion of the hydrophobic side of a monolayer to the silylated, glass surface, i.e. the surface rendered hydrophobic, occurred between monofilms containing unfluorinated hydrocarbon chains (Comparison Example C) and those containing terminally fluorinated compounds (Example 3). The layered systems investigated differed only in the first monolayer. The first monolayer was in each case transferred by flat dipping, i.e. the sample surface was dipped parallel to the surface. Transfer of the subsequent monolayers took place by vertical dipping. The $F_3C_{18}$:hexadecane monofilm was transferred after storage for 10 minutes in order to insure evaporation of excess hexadecane.

Chemical composition of the layered systems:
Silylated glass surface
1st monolayer (downwards):
 (upper half of the slide = Comparison Example C)
 $C_{18}$, $\pi = 30$ mN/M (lower half of the slide=Example 3) F₃C₁₈:hexadecane =1:20, π=30 mN/m 2nd monolayer (upwards) and 3rd monolayer (downwards): C₂₀, π=40 mN/M.

4th monolayer (upwards): So:C₂₀-Me:C₂₀=1:2:18, π=40 mN/M.

After application of the 4th monolayer, the absorption difference spectrum between the upper and lower halves of the layered system is recorded. No difference can be detected.

5th step (downwards): Attachment of a polystyrene film which had previously been coated with two C₂₀ monolayers.

6th step (upwards): Separation of the polystyrene film on removal of the sample. The intermolecular interactions determined along which layer plane the layered system was separated.

After transfer of the 4th monolayer and after completion of the 6th step, a difference spectrum in the absorption between the upper and lower halves of the layered system was measured.

The difference in absorption between the upper and lower layered system directly after transfer of the 4th monolayer was negligible compared with the difference spectrum which had been measured after mechanical removal of the polystyrene skin. Even with the naked eye, it could be seen, from the fluorescence intensity, that the upper layered system had been separated from the glass slide and thus exhibited no fluorescence, whereas the lower layered system resisted the mechanical load on removal of the polystyrene skin and remained adhering to the glass slide at least to the 4th monolayer.

The adhesion of the upper layered system was determined by the intermolecular interactions between unfluorinated hydrocarbon chains and the silylated glass surface. In the lower layered system, some of the unfluorinated hydrocarbon chains were replaced by terminally fluorinated chains and exhibited considerably improved adhesion.

We claim:

1. A film comprising at least one unimolecular layer which has been transferred onto a base material and comprises at least one amphiphilic compound having a hydrophilic and a hydrophobic region, wherein the amphiphilic compound has the formula (II)

$$X-(CH_2)_n-(CF_2)_m-CF_3 \quad (II)$$

in which X is a hydrophilic group, n is an integer from 6 to 24, m is an integer from 0 to 18 and the sum of n+M is an integer from 6 to 24 and the amphiphilic compound formula (II) is present in a mixture with an amphiphilic compound of the formula (III)

$$X^1-(CH_2)_p-CH_3 \quad (III)$$

in which $X^1$ is a hydrophilic group and p is an integer from 12 to 14.

2. A film comprising at least one unimolecular layer which has been transferred onto a base material and comprises at least one amphiphilic compound having a hydrophilic and a hydrophobic region, wherein the amphiphilic compound is a compound of the formula (I)

$$X-(CH_2)_n-Y \quad (I)$$

in which n is an integer from 6 to 25, Y is a chemically modified substituent selected from the group of phenyl, CF₃, methylester-, ethylester-, mercapto- and —O—CO(CH₂)$_q$CH₃, in which q is an integer from 0 to 4 and X is a hydrophilic group, whose dipole moment is greater than or equal to that of Y.

3. A film comprising at least two unimolecular layers of at least one amphiphilic compound with a hydrophilic and a hydrophobic region transferred onto a base material which comprises at least one layer consisting essentially of a fist amphiphilic compound of the formula (I)

$$X-(CH_2)_n-Y$$

wherein the hydrophobic region of which comprises at least one chemically modified hydrocarbon chain, that the molecules of this first amphiphilic compound are oriented in the same direction, parallel to one another and essentially perpendicular to the layer plane, the molecules of each adjacent layers faces one another in alternating fashion by means of their hydrophilic or hydrophobic regions and that the first amphiphilic compound has a hydrophobic molecular region with a dipole moment which, at the contact surface, points in the same direction as the dipole moment of the hydrophobic molecular region of the amphiphilic compound, which essentially forms the adjacent layer.

4. A film as claimed in claim 3, wherein the first amphiphilic compound contains a hydrophobic molecular region having a dipole moment which, at the contact surface, points in the same direction as the dipole moment of the hydrophobic molecular region of the amphiphilic compound, which essentially forms the adjacent layer.

5. A film as claimed in claim 3, wherein the first amphiphilic compound is a compound of the formula (I)

$$X-(CH_2)_n-Y \quad (I)$$

in which X is a hydrophilic group, Y is a chemically modified substituent whose dipole moment is less than or equal to that of X, and n denotes an integer from 6 to 25.

6. A film as claimed in claim 4, wherein the first amphiphilic compound of the formula (I) is present in a mixture with an amphiphilic compound of the formula (III)

$$X^1-(CH_2)_p-CH_3 \quad (III)$$

where $X^1$ denotes a hydrophilic group, and p is a number from 12 to 14.

7. A film as claimed in claim 3, wherein the first amphiphilic compound is a compound of the formula $$X\begin{matrix} A_n-Y \\ \diagdown \\ B_m-C \end{matrix}$$

in which X denotes a polar group, A and B denote methene or halogenated methene groups, and C denotes a methyl or halogenated methyl group, Y denotes a substituent whose polarity differs from the hydrophobic chain and is less than or equal to that of X, n is greater than or equal to m, and m denotes an integer from 4 to 25.

* * * * *